United States Patent
Kim et al.

(10) Patent No.: US 10,460,043 B2
(45) Date of Patent: Oct. 29, 2019

(54) APPARATUS AND METHOD FOR CONSTRUCTING MULTILINGUAL ACOUSTIC MODEL AND COMPUTER READABLE RECORDING MEDIUM FOR STORING PROGRAM FOR PERFORMING THE METHOD

(71) Applicants: SAMSUNG ELECTRONICS CO., LTD., Suwon-si (KR); IDIAP RESEARCH INSTITUTE, Martigny (CH)

(72) Inventors: Nam-Hoon Kim, Seongnam-si (KR); Petr Motlicek, Martigny (CH); Philip Neil Garner, Martigny (CH); David Imseng, Martigny (CH); Jae-won Lee, Seoul (KR); Jeong-Mi Cho, Seongnam-si (KR)

(73) Assignees: SAMSUNG ELECTRONICS CO., LTD., Suwon-si (KR); IDIAP RESEARCH INSTITUTE, Martigny (CH)

( * ) Notice: Subject to any disclaimer, the term of this patent is extended or adjusted under 35 U.S.C. 154(b) by 384 days.

(21) Appl. No.: 14/087,490

(22) Filed: Nov. 22, 2013

(65) Prior Publication Data
US 2014/0149104 A1    May 29, 2014

Related U.S. Application Data

(60) Provisional application No. 61/729,447, filed on Nov. 23, 2012.

(30) Foreign Application Priority Data

Sep. 26, 2013 (KR) .......................... 10-2013-0114397

(51) Int. Cl.
*G06F 17/28* (2006.01)
*G10L 15/00* (2013.01)
(Continued)

(52) U.S. Cl.
CPC .................................. *G06F 17/289* (2013.01)

(58) Field of Classification Search
CPC ...... G10L 15/06; G10L 15/063; G10L 15/083; G10L 15/16; G10L 15/18
(Continued)

(56) References Cited

U.S. PATENT DOCUMENTS 5,758,023 A * 5/1998 Bordeaux ............... G10L 15/16
                                                          704/232
7,447,633 B2   11/2008 Navratil et al.
(Continued)

FOREIGN PATENT DOCUMENTS

CN        101393740 A       3/2009
KR   10-2004-0088368 A     10/2004

OTHER PUBLICATIONS

Yanmin Qian et al., "Strategies for using MLP based features with limited target-language training data", Proceedings of ASRU 2011, Dec. 11, 2011 (Dec. 11, 2011), pp. 354-358, XP055107165.
(Continued)

*Primary Examiner* — Richemond Dorvil
*Assistant Examiner* — Rodrigo A Chavez
(74) *Attorney, Agent, or Firm* — Sughrue Mion, PLLC (57) ABSTRACT

An apparatus and a method for constructing a multilingual acoustic model, and a computer readable recording medium are provided. The method for constructing a multilingual acoustic model includes dividing an input feature into a common language portion and a distinctive language portion, acquiring a tandem feature by training the divided common language portion and distinctive language portion
(Continued)

using a neural network to estimate and remove correlation between phonemes, dividing parameters of an initial acoustic model constructed using the tandem feature into common language parameters and distinctive language parameters, adapting the common language parameters using data of a training language, adapting the distinctive language parameters using data of a target language, and constructing an acoustic model for the target language using the adapted common language parameters and the adapted distinctive language parameters.

18 Claims, 6 Drawing Sheets

(51) Int. Cl.
*G10L 15/06* (2013.01)
*G10L 15/16* (2006.01)

(58) Field of Classification Search
USPC .............. 704/2, 8, 9, 202, 232, 256.2, 259, 704/E17.006
See application file for complete search history.

(56) References Cited

U.S. PATENT DOCUMENTS

| | | | |
|---|---|---|---|
| 7,487,087 B2 | 2/2009 | Attias et al. | |
| 7,761,297 B2 | 7/2010 | Lee | |
| 8,311,824 B2 | 11/2012 | Lubowich et al. | |
| 8,712,773 B2 | 4/2014 | Zheng et al. | |
| 2003/0204394 A1* | 10/2003 | Garudadri | G10L 15/02 704/201 |
| 2004/0024585 A1* | 2/2004 | Srivastava | G10L 25/78 704/10 |
| 2006/0111905 A1* | 5/2006 | Navratil | G10L 15/144 704/256.7 |
| 2008/0027725 A1* | 1/2008 | Chu | G10L 15/1807 704/257 |
| 2010/0106499 A1* | 4/2010 | Lubowich | G10L 15/005 704/235 |
| 2010/0121640 A1 | 5/2010 | Zheng et al. | |
| 2010/0312545 A1* | 12/2010 | Sites | G06F 17/275 704/8 |
| 2010/0318355 A1* | 12/2010 | Li | G10L 15/063 704/244 |
| 2014/0025381 A1* | 1/2014 | Wang | G10L 25/69 704/260 |
| 2015/0019214 A1* | 1/2015 | Wang | G10L 15/34 704/232 |

OTHER PUBLICATIONS

Samuel Thomas, et al., "Multilingual MLP features for low-resource LVCSR systems", Proceedings of ICASSP 2012, Mar. 25, 2012 (Mar. 25, 2012), pp. 4269-4272, XP032228098.
Lukas Burget, et al., "Multilingual acoustic modeling for speech recognition based on subspace Gaussian Mixture Models", Proceedings of ICASSP 2010, Mar. 14, 2010 (Mar. 14, 2010), pp. 4334-4337, XP032126152.
Liang Lu, et al., "Regularized subspace Gaussian mixture models for cross-lingual speech recognition", Proceedings of ASRU 2011, Dec. 11, 2011 (Dec. 11, 2011), pp. 365-370 XP032126154.
Liang Lu, et al., "Maximum a posteriori adaptation of subspace Gaussian mixture models for cross-lingual speech recognition", Proceedings of ICASSP 2012, Mar. 25, 2012 (Mar. 25, 2012), pp. 4877-4880 XP032228248.
Communication from the European Patent Office dated Apr. 1, 2014 in a counterpart European Application No. 13193872.2.
Lukas Burget, et al., "Multilingual acoustic modeling for speech recognition based on subspace Gaussian Mixture Models", Proceedings of ICASSP 2010, Mar. 14, 2010 (Mar. 14, 2010), pp. 4334-4337, XP032126152, total 4 pages.
Communication dated Apr. 23, 2015 issued by the European Patent Office in counterpart European Patent Application No. 13 193 872.2.
Povey, et al., "Subspace Gaussian Mixture Models for Speech Recognition", pp. 1-4, Mar. 14, 2010, 2010 IEEE International Conference on Acoustics, Speech and Signal Processing.
Ellis, et al., "Tandem Acoustic Modeling in Large-Vocabulary Recognition", 4 pgs., May 7, 2001, 2001 IEEE International Conference on Acoustics, Speech and Signal Processing.
Communication dated Nov. 18, 2015 by the European Patent Office in counterpart Application No. 13193872.2.
Communication dated Mar. 23, 2017, issued by the European Patent Office in counterpart European Application No. 13193872.2.
Communication dated Apr. 2, 2018 issued by the State Intellectual Property Office of P.R. China in counterpart Application No. 201310603916.1.
Rahim Saeidi et al., "Particle Swarm Optimization for Sorted Adapted Gaussian Mixture Models", IEEE Transactions on Audio, Speech, and Language Processing, vol. 17, No. 2, Feb. 2009, pp. 344-353.
Communication dated Nov. 26, 2018, issued by the State Intellectual Property Office of P.R. China in counterpart Chinese Application No. 201310603916.1.
Communication dated May 17, 2019, issued by the State Intellectual Property Office of P.R. China in counterpart Chinese Application No. 201310603916.1.

* cited by examiner

Acoustic Model Space

FIG. 4B

Acoustic Model Space ured, and more particularly, to constructing a multilingual acoustic model which reflects multiple languages and dialects reflecting regional characteristics of a language.

APPARATUS AND METHOD FOR CONSTRUCTING MULTILINGUAL ACOUSTIC MODEL AND COMPUTER READABLE RECORDING MEDIUM FOR STORING PROGRAM FOR PERFORMING THE METHOD

CROSS-REFERENCE TO RELATED APPLICATIONS

This application claims priority from U.S. Provisional Application No. 61/729,447, filed on Nov. 23, 2012 in the United States Patent and Trademark Office, and Korean Patent Application No. 10-2013-0114397, filed on Sep. 26, 2013 in the Korean Intellectual Property Office, the disclosures of which are incorporated herein by reference in its entireties.

BACKGROUND

Field

Apparatuses and methods consistent with exemplary embodiments relate to constructing a multilingual acoustic model, and more particularly, to constructing a multilingual acoustic model which reflects multiple languages and dialects reflecting regional characteristics of a language.

Description of the Related Art

Diverse types of electronic devices, such as smart phones and smart televisions, may provide voice recognition functionality. For example, an acoustic model which utilizes statistics-based technology may be used for voice recognition.

However, because each country or region has different linguistic characteristics, a single acoustic model may not cover voice recognition for all the languages and linguistic characteristics found in each country or region. Thus, the voice recognition technology may use a different acoustic model for each language in order to provide the functionality of voice recognition.

One way to construct an acoustic model for voice recognition is to secure sufficient data for each language. For languages used by many people, such as English, Chinese, Italian, German, and Spanish, it may be easier to acquire sufficient data, whereas for languages used by a small number of people or inaccessible languages, it may be difficult to acquire sufficient data.

Thus, an acoustic model for multiple languages or dialects may be constructed using Hidden Markov Model (HMM)/Gaussian Mixture Model (GMM)-based adaptation technology. Specifically, a seed acoustic model may be constructed using data of a language for which sufficient data exists. The seed acoustic model may be constructed using the HMM/GMM-based adaptation technology which adapts to an acoustic model of a language which is to be constructed.

However, when using this method for constructing an acoustic model for multiple languages or dialects based on the HMM/GMM, languages used for the adaptation technology have to use the same phoneme-level unit. For example, in order to acquire a British English acoustic model, an American English acoustic model may be used as a training acoustic model, but a Korean acoustic model may not be used. In addition, in order to enhance voice recognition performance when using the method for constructing an acoustic model for multiple languages or dialects based on the HMM/GMM, a large amount of data for a target language are needed to acquire the acoustic model.

SUMMARY

Exemplary embodiments may overcome the above disadvantages and other disadvantages not described above. Also, an exemplary embodiment is not required to overcome the disadvantages described above, and an exemplary embodiment may not overcome any of the problems described above.

According to an aspect of an exemplary embodiment, there is provided a method for constructing a multilingual acoustic model, the method including dividing an input feature into a common language portion and a distinctive language portion, acquiring a tandem feature by training the divided common language portion and distinctive language portion using a neural network to estimate and remove correlation between phonemes, dividing parameters of an initial acoustic model constructed using the tandem feature into common language parameters and distinctive language parameters, adapting the common language parameters using data of a training language, adapting the distinctive language parameters using data of a target language, and constructing an acoustic model for the target language using the adapted common language parameters and the adapted distinctive language parameters.

The dividing of the input feature may include dividing the input feature of the target language into the common language portion and the distinctive language portion. The acquiring of the tandem feature may include training the divided common language portion and distinctive language portion using the neural network, and acquiring the tandem feature by combining the common language portion and distinctive language portion that are output by the training.

The training may include estimating posterior probability values of phonemes of the common language portion and the distinctive language portion using the neural network, and removing correlation between the phonemes.

In the estimating, the posterior probability values of the phonemes of the training language may be estimated using a Multi Layer Perceptron (MLP) model, and in the removing, the correlation between the phonemes may be removed using a Principal Component Analysis (PCA) procedure.

The common language portion may be trained on the neural network using the training language data, and the distinctive language portion may be trained on the neural network using the target language data.

The constructing may include constructing a Subspace Gaussian Mixture Model (SGMM) acoustic model by performing SGMM training for the acquired tandem feature, dividing parameters of the SGMM acoustic model into common language parameters and distinctive language parameters, adapting the common language parameters using the training language data, and adapting the distinctive language parameters using the target language data, and constructing the acoustic model for the target language by combining the common language parameters adapted using the training language and the distinctive language parameters adapted using the target language.

Adapting may be performed using at least one of a Maximum Likelihood Linear Regression (MLLR) algorithm and a Maximum A Posteriori (MAP) algorithm.

An amount of data of the training language may be larger than an amount of data of the target language.

According to an aspect of another exemplary embodiment, there is provided a multilingual acoustic model constructing apparatus including a tandem feature acquirer configured to divide an input feature of a target language into a common language portion and a distinctive language portion, and acquire a tandem feature by training the divided common language portion and distinctive language portion using a neural network, and an acoustic model trainer configured to divide parameters of an initial acoustic model constructed using the tandem feature into common language parameters and distinctive language parameters, adapt the common language parameters using data of a training language, adapt the distinctive language parameters using data of the target language, and construct an acoustic model for the target language using the adapted common language parameters and the adapted distinctive language parameters.

The tandem feature acquirer may include a divider configured to divide the input feature of the target language into the common language portion and the distinctive language portion, a trainer configured to train the divided common language portion and distinctive language portion using the neural network, and a feature combiner configured to acquire the tandem feature by combining the common language portion and distinctive language portion that are output by the training.

The trainer may include an estimator configured to estimate posterior probability values of phonemes of the common language portion and the distinctive language portion using the neural network, and a remover configured to remove correlation between the phonemes.

The estimator may estimate the posterior probability values of the phonemes of the training language using a Multi Layer Perceptron (MLP) model, and wherein the remover may remove the correlation between the phonemes using a Principal Component Analysis (PCA) procedure.

The common language portion may be trained on the neural network using the training language data, and wherein the distinctive language portion may be trained on the neural network using the target language data.

The acoustic model trainer may include an SGMM acoustic model trainer configured to construct a Subspace Gaussian Mixture Model (SGMM) acoustic model by performing SGMM training for the acquired tandem feature, a parameter divider configured to divide parameters of the SGMM acoustic model into common language parameters and distinctive language parameters, an adapter configured to adapt the common language parameters using the training language data, and adapt the distinctive language parameters using the target language data, and a parameter combiner configured to construct the acoustic model for the target language by combining the common language parameters adapted using the training language and the distinctive language parameters adapted using the target language.

The adapter may perform adaptation using at least one of a Maximum Likelihood Linear Regression (MLLR) algorithm and a Maximum A Posteriori (MAP) algorithm.

An amount of data of the training language may be larger than an amount of data of the target language.

According to an aspect of another exemplary embodiment, there is provided a non-transitory computer readable recording medium which records a program for performing a multilingual acoustic model constructing method including dividing an input feature into a common language portion and a distinctive language portion, acquiring a tandem feature by training the divided common language portion and distinctive language portion using a neural network to estimate and remove correlation between phonemes, dividing parameters of an initial acoustic model constructed using the tandem feature into common language parameters and distinctive language parameters, adapting the common language parameters using data of a training language, adapting the distinctive language parameters using data of a target language, and constructing an acoustic model for the target language using the adapted common language parameters and the adapted distinctive language parameters.

BRIEF DESCRIPTION OF THE DRAWING FIGURES

The above and/or other aspects will be more apparent by describing certain exemplary embodiments with reference to the accompanying drawings, in which.

DETAILED DESCRIPTION OF THE EXEMPLARY EMBODIMENTS

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding. Thus, it is apparent that the exemplary embodiments can be carried out without those specifically defined matters. Also, well-known functions or constructions are not described in detail because they may obscure one or more exemplary embodiments.

Figure 1:
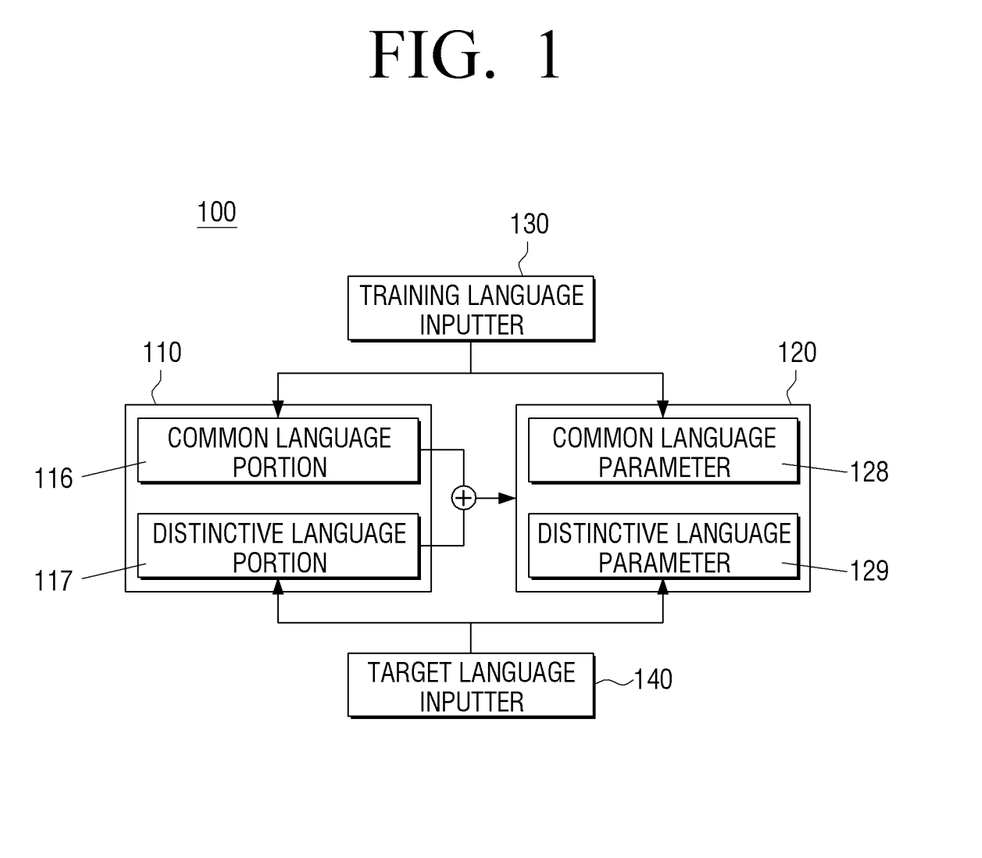
FIG. 1 is a block diagram of a configuration of a multilingual voice recognition apparatus according to an exemplary embodiment.

FIG. 1 is a block diagram of a configuration of a multilingual acoustic model constructing apparatus 100 according to an exemplary embodiment. As shown in FIG. 1, the multilingual voice recognition apparatus 100 may include a tandem feature acquirer 110, an acoustic model trainer 120, a training language inputter 130, and a target language inputter 140 each of which may be stored in a memory and executed on a processor of an electronic device. Hereinafter, a "target language" indicates a language having a small amount of data that the user wishes to recognize, and a "training language" indicates a language having a large amount of data used to acquire the target language. The amount of data of the training language may be larger than the amount of data of the target language. For example, the target language may be Arabic, and the training language may be English.

The tandem feature acquirer 110 divides an input feature into a common language portion 116 and a distinctive language portion 117 as shown in FIG. 1, and acquires a tandem feature by applying the divided common language portion 116 and distinctive language portion 117 to training based on a neural network.

Figure 2:
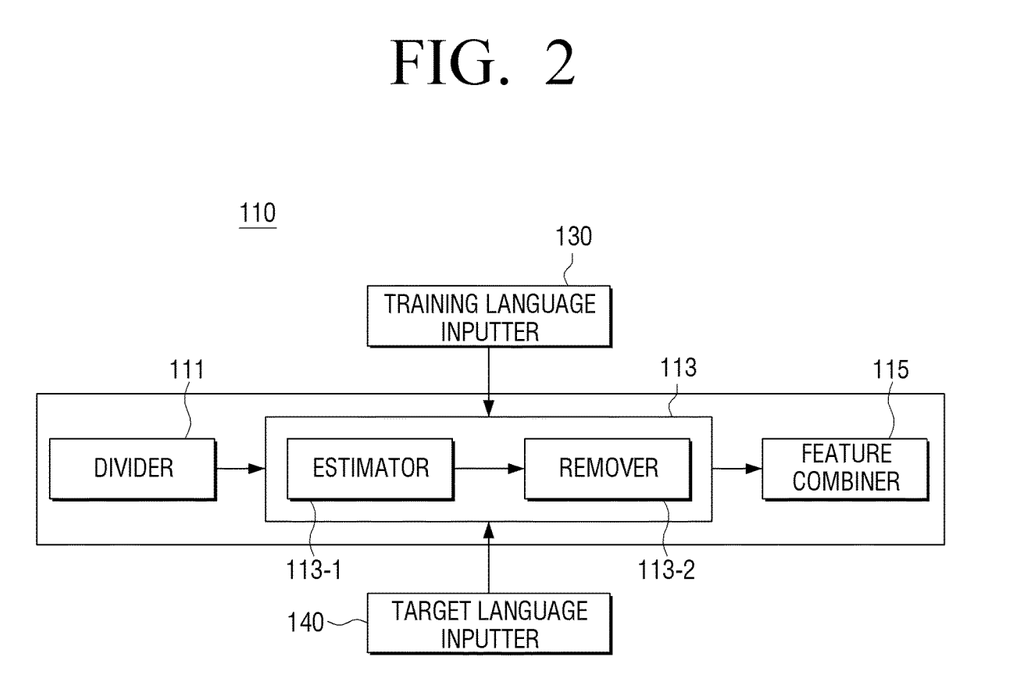
FIG. 2 is a block diagram of a configuration of a tandem feature acquirer according to an exemplary embodiment.

The tandem feature acquirer 110 is described in greater detail with reference to FIG. 2. The tandem feature acquirer 110 may include a divider 111, a trainer 113, and a feature combiner 115.

The divider 111 may divide an input feature into a common language portion 116 and a distinctive language portion 117. The common language portion 116 is a common language portion which is not related to an input language, and the distinctive language portion 117 is a distinctive language portion related to an input language.

The trainer 113 applies the divided common language portion 116 and distinctive language portion 117 to training based on the neural network. In particular, the trainer 113 may train the common language portion 116 using data of the training language, and train the distinctive language portion 117 using data of the target language. In particular, the trainer 113 may include an estimator 113-1 and a remover 113-2 as shown in FIG. 2. The estimator 113-1 estimates a posterior probability value of a phoneme of the training language from the data of the training language input from the training language inputter 130 with respect to the common language portion 116. In addition, the estimator 113-1 estimates a posterior probability value of a phoneme of the target language from the data of the target language input from the target language inputter 140 with respect to the distinctive language portion 117. At this time, the estimator 113-1 may estimate posterior probability values of phonemes using a neural network such as Multi Layer Perceptron (MLP). The remover 113-2 removes correlation between the phonemes using Principal Component Analysis (PCA). More specifically, when correlative variables (x1, x2, x3, . . . , xp) are observed, PCA may generate a small number of new variables which secure the maximum information of the variables. The remover 113-2 may acquire tandem features of the common language portion 116 and the distinctive language portion 117 by removing correlation between the correlative phonemes of the training language using PCA.

The feature combiner 115 acquires a tandem feature of the target language by combining the tandem feature of the common language portion 116 and the tandem feature of the distinctive language portion 117.

Using the tandem feature acquirer 110 as described above, the multilingual acoustic model constructing apparatus 100 may acquire the tandem feature of the target language that the user wishes to recognize from the training language data and the target language data.

In the above exemplary embodiment, it is merely an example that the estimator 113-1 estimates the posterior probability value using MLP. It is also possible to estimate posterior probability values of phonemes using other neural networks.

Returning to FIG. 1, the acoustic model trainer 120 may construct an acoustic model using the tandem feature acquired by the tandem feature acquirer 110, divide a parameter of the acoustic model into a common language parameter 128 and a distinctive language parameter 129, adapt to the common language parameter 128 using the training language data input by the training language inputter 130, adapt to the distinctive language parameter 129 using the target language data input by the target language inputter 140, and construct an acoustic model to use to recognize the target language using the adapted common language parameter 128 and distinctive language parameter 129.

Figure 3:
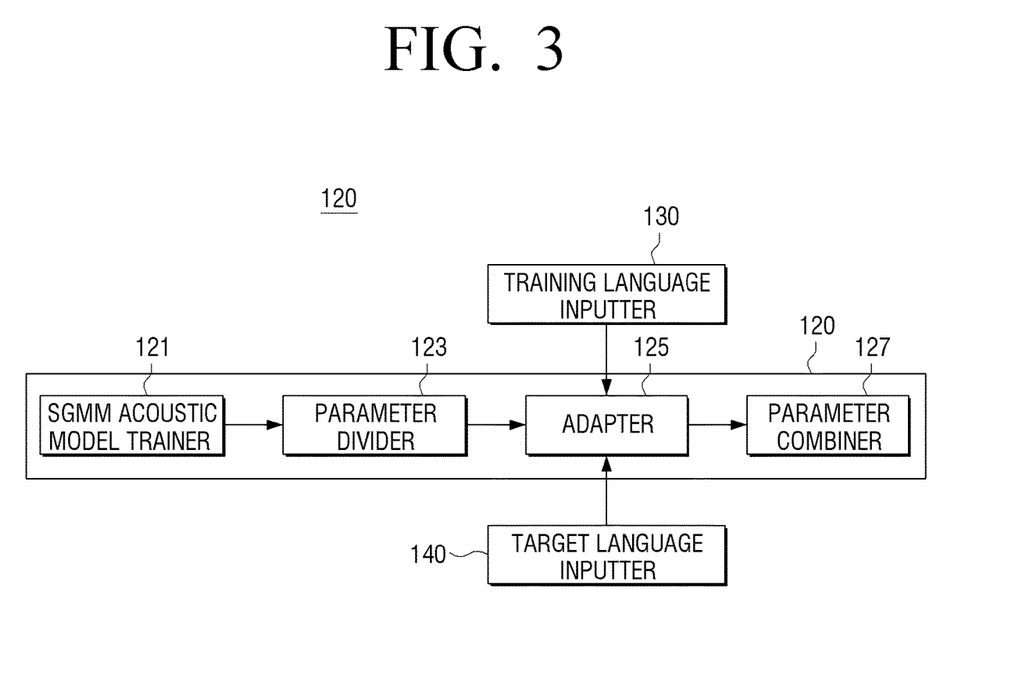
FIG. 3 is a block diagram of a configuration of an acoustic model trainer according to an exemplary embodiment.

In particular, the acoustic model trainer 120 is described with reference to FIGS. 3 to 4B. The acoustic model trainer 120 may include an SGMM acoustic model trainer 121, a parameter divider 123, an adapter 125, and a parameter combiner 127 as shown in FIG. 3.

The SGMM acoustic model trainer 121 may construct an acoustic model based on the SGMM for the input tandem feature. The SGMM acoustic model trainer 121 may not construct an acoustic model based on the related-art HMM/GMM, but construct an acoustic model based on the SGMM. An acoustic model based on the HMM/GMM and an acoustic model based on the SGMM are described with reference to FIGS. 4A and 4B.

Figure 4A:
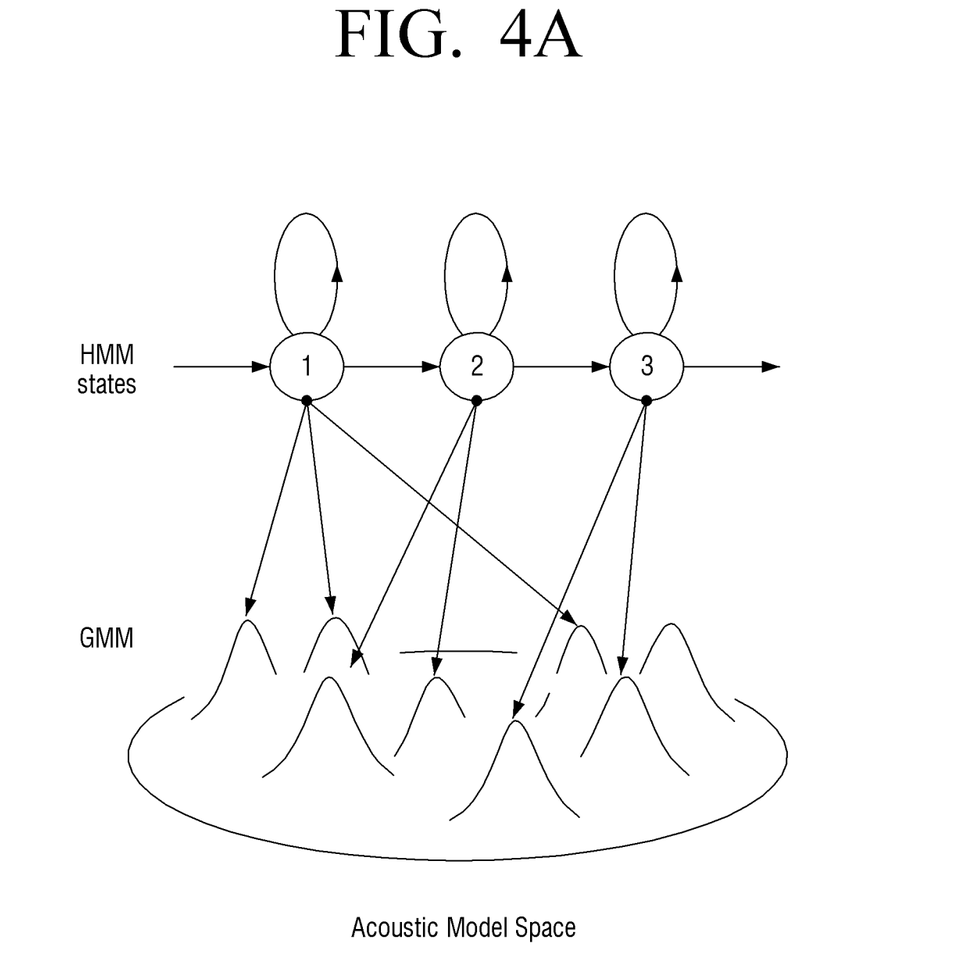
FIGS. 4A and 4B are provided to describe an HMM/GMM-based acoustic model and an SGMM-based acoustic model according to an exemplary embodiment.

FIG. 4A is a diagram of an acoustic model structure based on the HMM/GMM. The HMMs are connected through a plurality of states as shown in FIG. 4A. Each state is modeled as a mixture having different weighted values in a plurality of Gaussians in an acoustic model space. Mathematical formula 1 represents a state probability in an acoustic model based on the HMM/GMM.

$$p(x|j) = \sum_{i=1}^{I} \omega_{ji} N(x; \mu_{ji}, \sum i) \quad \text{[Mathematical formula 1]}$$

Herein, ω denotes a Gaussian weighted value, μ denotes a mean, and Σ denotes a variance.

In the acoustic model based on the HMM/GMM, each state is directly connected to a parameter in the acoustic model space. In other words, each state has a GMM representing each state, and calculates a state probability value of an input feature value using the GMM. The GMM of each state is a statistical model estimated from a large amount of data. Accordingly, the more data are provided, the more reliable acoustic model based on the HMM/GMM may be estimated. That is, in the related art, a large amount of data for the target language is needed.

Figure 4B:
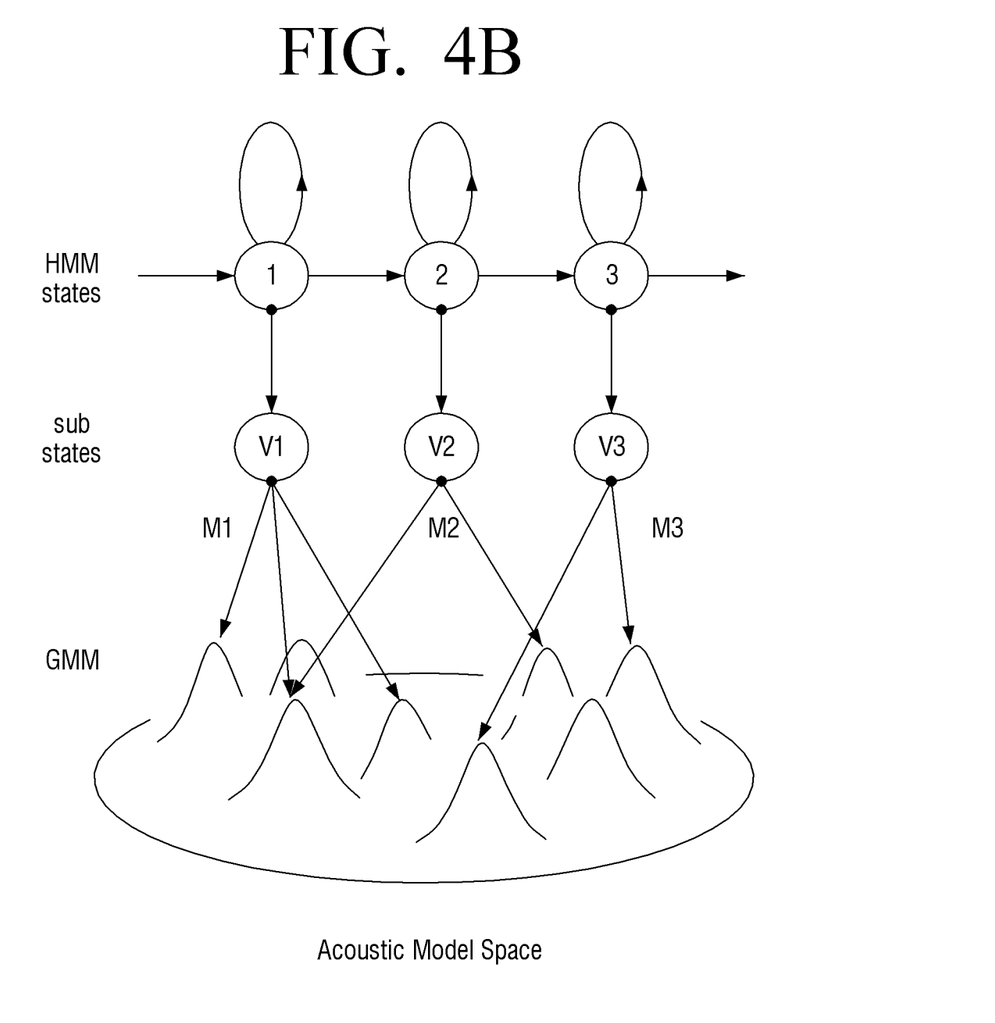

FIG. 4B is a diagram of an acoustic model structure based on the SGMM according to an exemplary embodiment. As shown in FIG. 4B, the acoustic model structure based on the SGMM is similar to that based on the HMM/GMM in that the HMM is connected through a plurality of states. However, in the acoustic model structure based on the SGMM, GMM parameter values are not directly connected to states, but are connected to states through sub-states. Mathematical formula 2 represents a state probability in the acoustic model based on the SGMM.

$$p(x|j) = \sum_{i=1}^{I} \omega_{ji} N(x; \mu_{ji}, \sum i) \quad \text{[Mathematical formula 2]}$$

$$\mu_{ji} = M_i v_j$$

$$\omega_{ji} = \frac{\exp w_i^T v_j}{\sum_{i=1}^{I} \exp w_i^T v_j}$$

Herein, ω denotes a Gaussian weighted value, μ denotes a mean, Σ denotes a variance, M denotes a sub-state matrix, and v and w denote sub-state vectors. By introducing the sub-state concept, the acoustic model structure based on the SGMM may generate an acoustic model using a small amount of data of the target language, and sharing of parameters between different languages is possible.

The parameter divider 123 divides parameters of the SGMM acoustic model acquired by the SGMM acoustic model trainer 132 into common language parameters 128 and distinctive language parameters 129. At this time, the parameter divider 123 may extract the Gaussian weighted value (ω), mean (µ), the variance (Σ), and the sub-state vector (v) as the common language parameters 128, and extract the sub-state matrix (M) and the sub-state (w) as the distinctive language parameters 129.

In addition, the parameter divider 123 may output the divided common language parameters 128 and distinctive language parameters 129 to the adapter 125.

The adapter 125 may adapt to the divided common language parameters 128 and distinctive language parameters 129 using diverse algorithms. At this time, the adapter 125 may adapt to the common language parameters 128 using training language data input through the training language inputter 130, and may adapt to the distinctive language parameters 129 using target language data input through the target language inputter 140.

The adapter 125 may adapt to the common language parameters 128 and the distinctive language parameters 129 using one of Maximum Likelihood Linear Regression (MLLR) algorithm and Maximum A Posteriori (MAP) algorithm.

The adapter 125 may output information regarding the common language parameters 128 and the distinctive language parameters 129 to the parameter combiner 127.

The parameter combiner 127 combines the common language parameters 128 and the distinctive language parameters 129 which are output from the adapter 125 and thereby constructs an acoustic model for the target language.

The acoustic model trainer 120 as described above may construct an acoustic model for a target language having much less data using a language having abundant data so that the user may perform voice recognition for a different language having a different phoneme-level unit.

Returning to FIG. 1, the training language inputter 130 provides the tandem feature acquirer 110 and the acoustic model trainer 120 with training language data. In particular, the training language inputter 130 may provide the tandem feature acquirer 110 with training language data to acquire a tandem feature for a common language portion 116, and provide the acoustic model trainer 120 with training language data to adapt to common language parameters 128. The training language provided by the training language inputter 130 may be a language having large data, such as English.

The target language inputter 140 provides the tandem feature acquirer 110 and the acoustic model trainer 120 with target language data. In particular, the target language inputter 140 may provide the tandem feature acquirer 110 with target language data to acquire a tandem feature for a distinctive language portion 117, and provide the acoustic model trainer 120 with target language data to adapt to distinctive language parameters 129. The target language provided by the target language inputter 140 may be a language having small data, such as Arabic and African languages.

Figure 5:
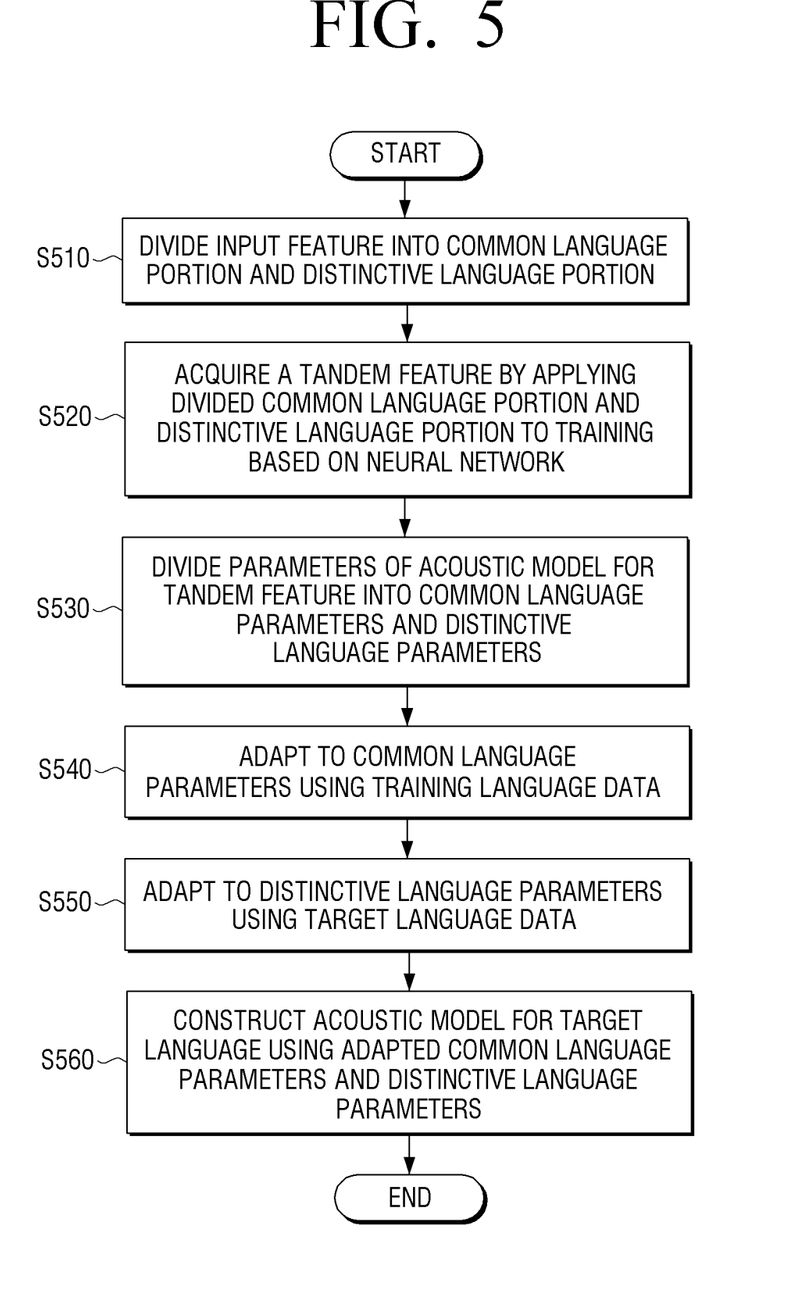
FIG. 5 is a flowchart showing a method for constructing a multilingual acoustic model according to an exemplary embodiment.

A multilingual acoustic model constructing method of a multilingual acoustic model constructing apparatus 100 according to an exemplary embodiment is described below with reference to FIG. 5.

Initially, the multilingual acoustic model constructing apparatus 100 divides an input feature into a common language portion and a distinctive language portion (S510). Then the acoustic model constructing apparatus acquires a tandem feature by applying the divided common language portion and distinctive language portion to training based on a neural network (S520). The common language portion is an element which may not related to an input language. Using the training language data, training based on the neural network may be applied to the common language portion. The distinctive language portion is an element which may be subordinate to an input language. Using the target language data, training based on the neural network may be applied to the distinctive language portion. The training language may be a language having a larger amount of data than the target language.

Subsequently, the multilingual acoustic model constructing apparatus 100 divides parameters of an acoustic model for the tandem feature into common language parameters and distinctive language parameters (S530). Then the acoustic model constructing apparatus adapts to the common language parameters using training language data (S540), and may then also adapt to the distinctive language parameters using target language data (S550), and may construct an acoustic model of the target language using the adapted common language parameters and distinctive language parameters (S560). The multilingual acoustic model constructing apparatus 100 may construct an acoustic model based on the SGMM for the input tandem feature, and divide parameters of the acoustic model based on the SGMM into common language parameters and distinctive language parameters.

Because an acoustic model for a target language having much less data is constructed using a language having abundant data as described above, the user may perform voice recognition for multiple languages and dialects having different phoneme-level units. In addition, voice recognition functionality may be enhanced by using a tandem feature and an acoustic model based on the SGMM together.

The multilingual acoustic model constructing method according to the diverse exemplary embodiments may be implemented with a program and be provided to a multilingual voice recognition apparatus.

More specifically, a non-transitory computer readable medium which stores a program including acquiring a tandem feature using training language data, constructing a first acoustic model using the training language data, dividing parameters of the first acoustic model into common language parameters and distinctive language parameters, adapting to a target language using the distinctive language parameters, constructing a second acoustic model using the common language parameters and the distinctive language parameters adapted to the target language, and performing voice recognition for the target language using the tandem feature and the second acoustic model may be provided.

The non-transitory computer readable medium is a medium which does not store data temporarily such as a register, cash, and memory but stores data semi-permanently and is readable by devices. More specifically, the aforementioned diverse applications or programs may be stored in a non-transitory computer readable medium such as a compact disk (CD), digital video disk (DVD), hard disk, Blu-ray disk, universal serial bus (USB), memory card, and read-only memory (ROM) and be provided.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for constructing a multilingual acoustic model, the method comprising:
   receiving a feature of a target language;

dividing the feature of the target language into a common language portion and a distinctive language portion;
acquiring a tandem feature by training the common language portion and the distinctive language portion using a neural network;
dividing parameters of an initial acoustic model constructed using the tandem feature into common language parameters and distinctive language parameters;
adapting the common language parameters using training language data;
adapting the distinctive language parameters using target language data; and
constructing an acoustic model for the target language using the adapted common language parameters and the adapted distinctive language parameters,
wherein the distinctive language portion is a feature specific to the target language, and the common language portion is a feature common to different languages including the target language.

2. The method as claimed in claim 1,
wherein the acquiring of the tandem feature comprises:
training the common language portion and the distinctive language portion using the neural network; and
acquiring the tandem feature by combining the common language portion and the distinctive language portion that result from the training.

3. The method as claimed in claim 2, wherein the training comprises:
estimating posterior probability values of phonemes of the common language portion and the distinctive language portion using the neural network; and
removing correlation between the phonemes.

4. The method as claimed in claim 3, wherein the estimating comprises estimating the posterior probability values of the phonemes of a training language are estimated using a Multi Layer Perceptron (MLP) model, and
wherein the removing comprises removing the correlation between the phonemes using a Principal Component Analysis (PCA) procedure.

5. The method as claimed in claim 2, wherein the common language portion is trained on the neural network using the training language data, and
wherein the distinctive language portion is trained on the neural network using the target language data.

6. The method as claimed in claim 1, wherein the constructing comprises:
constructing a Subspace Gaussian Mixture Model (SGMM) acoustic model by performing SGMM training for the acquired tandem feature;
dividing parameters of the SGMM acoustic model into common language parameters and distinctive language parameters;
adapting the common language parameters using the training language data, and adapting the distinctive language parameters using the target language data; and
constructing the acoustic model for the target language by combining the common language parameters adapted using a training language and the distinctive language parameters adapted using the target language.

7. The method as claimed in claim 6, wherein the adapting is performed using at least one of a Maximum Likelihood Linear Regression (MLLR) algorithm and a Maximum A Posteriori (MAP) algorithm.

8. The method as claimed in claim 1, wherein an amount of the training language data is larger than an amount of the target language data.

9. A multilingual acoustic model constructing apparatus comprising:
a tandem feature acquirer configured to receive a feature of a target language, divide the feature of the target language into a common language portion and a distinctive language portion, and acquire a tandem feature by training the divided common language portion and distinctive language portion using a neural network; and
an acoustic model trainer configured to divide parameters of an initial acoustic model constructed using the tandem feature into common language parameters and distinctive language parameters, adapt the common language parameters using training language data, adapt the distinctive language parameters using target language data, and construct an acoustic model for the target language using the adapted common language parameters and the adapted distinctive language parameters,
wherein the distinctive language portion is a feature specific to the target language, and the common language portion is a feature common to different languages including to the target language.

10. The apparatus as claimed in claim 9, wherein the tandem feature acquirer comprises:
a trainer configured to train the divided common language portion and distinctive language portion using the neural network; and
a feature combiner configured to acquire the tandem feature by combining the common language portion and distinctive language portion that are output by the training.

11. The apparatus as claimed in claim 10, wherein the trainer comprises:
an estimator configured to estimate posterior probability values of phonemes of the common language portion and the distinctive language portion using the neural network; and
a remover configured to remove correlation between the phonemes.

12. The apparatus as claimed in claim 11, wherein the estimator estimates the posterior probability values of the phonemes of a training language using a Multi-Layer Perceptron (MLP) model, and
wherein the remover removes the correlation between the phonemes using a Principal Component Analysis (PCA) procedure.

13. The apparatus as claimed in claim 10, wherein the common language portion is trained on the neural network using the training language data, and
wherein the distinctive language portion is trained on the neural network using the target language data.

14. The apparatus as claimed in claim 9, wherein the acoustic model trainer comprises:
a Subspace Gaussian Mixture Model (SGMM) acoustic model trainer configured to construct a Subspace Gaussian Mixture Model (SGMM) acoustic model by performing SGMM training for the acquired tandem feature;
a parameter divider configured to divide parameters of the SGMM acoustic model into common language parameters and distinctive language parameters;
an adapter configured to adapt the common language parameters using the training language data, and adapt the distinctive language parameters using the target language data; and a parameter combiner configured to construct the acoustic model for the target language by combining the common language parameters adapted using a training language and the distinctive language parameters adapted using the target language.

15. The apparatus as claimed in claim 14, wherein the adapter performs adaptation using at least one of a Maximum Likelihood Linear Regression (MLLR) algorithm and a Maximum A Posteriori (MAP) algorithm.

16. The apparatus as claimed in claim 9, wherein an amount of the training language data is larger than an amount of the target language data.

17. The apparatus as claimed in claim 9, wherein the initial acoustic model comprises:
   a plurality of Hidden Markov Model (HMM) states configured to be connected to each other;
   a plurality of sub-states, wherein each of the plurality of sub-states is configured to be connected to one corresponding HMM state of the plurality of HMM states; and
   an acoustic model space comprising a plurality of Gaussian Mixture Model (GMM) parameter values, wherein the plurality of GMM parameter values are configured to be connected directly to at least one of the plurality of sub-states,
   wherein each of the plurality of HMM states is not directly connected to the plurality of GMM parameter values.

18. A non-transitory computer readable recording medium which records a program for performing a multilingual acoustic model constructing method comprising:
   receiving a feature of a target language;
   dividing the feature of the target language into a common language portion and a distinctive language portion;
   acquiring a tandem feature by training the common language portion and the distinctive language portion using a neural network to estimate and remove correlation between phonemes;
   dividing parameters of an initial acoustic model constructed using the tandem feature into common language parameters and distinctive language parameters;
   adapting the common language parameters using training language data;
   adapting the distinctive language parameters using target language data; and
   constructing an acoustic model for the target language using the adapted common language parameters and the adapted distinctive language parameters,
   wherein the distinctive language portion is a feature specific to the target language, and the common language portion is a feature common to different languages including the target language.

* * * * *